United States Patent
Wu et al.

(10) Patent No.: US 7,555,374 B2
(45) Date of Patent: Jun. 30, 2009

(54) METHOD FOR MONITORING A MOTOR SPEED SENSOR

(75) Inventors: Peter E. Wu, Brighton, MI (US);
Charles J Van Horn, Novi, MI (US);
Wei D. Wang, Troy, MI (US); Syed Naqi, Ann Arbor, MI (US)

(73) Assignees: GM Global Technology Operations, Inc., Detroit, MI (US); Daimler AG, Stuttgart (DE); Chrysler LLC, Auburn Hills, MI (US); Bayerishe Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/247,327

(22) Filed: Oct. 8, 2008

(65) Prior Publication Data

US 2009/0105898 A1    Apr. 23, 2009

Related U.S. Application Data

(60) Provisional application No. 60/981,903, filed on Oct. 23, 2007.

(51) Int. Cl.
*B60K 1/02* (2006.01)
(52) U.S. Cl. .............. 701/29; 701/31; 701/33; 701/51; 477/3; 477/15; 180/65.8
(58) Field of Classification Search ............... 701/29, 701/31, 33, 51–60; 477/2, 3, 15; 180/65.2–65.8
See application file for complete search history.

(56) References Cited

U.S. PATENT DOCUMENTS

| | | | | |
|---|---|---|---|---|
| 7,448,981 B2 * | 11/2008 | Mashiki | ............... | 477/3 |
| 7,481,737 B2 * | 1/2009 | Tabata et al. | ............... | 477/3 |
| 7,487,852 B2 * | 2/2009 | Leone et al. | ............... | 123/406.44 |
| 7,497,803 B2 * | 3/2009 | Sah et al. | ............... | 477/3 |

* cited by examiner

*Primary Examiner*—Richard M. Camby (57) ABSTRACT

A method for detecting speed faults in a hybrid powertrain having engine and electric machine speed inputs includes directly sensing the engine and machine speeds and performing comparisons of sensed engine speed with engine speed determined based upon the machine speeds.

20 Claims, 4 Drawing Sheets

METHOD FOR MONITORING A MOTOR SPEED SENSOR

CROSS REFERENCE TO RELATED APPLICATIONS

This application claims the benefit of U.S. Provisional Application No. 60/981,903 filed on Oct. 23, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures include torque-generative devices, including internal combustion engines and electric machines, which transfer torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transferring tractive torque thereto. Electric machines, operative as motors or generators, generate a torque input to the transmission, independently of a torque input from the internal combustion engine. The electric machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method to monitor a powertrain system including a transmission device including an input member and a first sensor operative to monitor rotation of the input member, a plurality of torque machines and a corresponding plurality of rotational speed sensing devices, an output member, and first and second control modules includes signally connecting the first sensor directly to the first control module and directly to the second control module, signally connecting the rotational speed sensing devices directly to the second control module, monitoring signal inputs from the first sensor in the first and second control modules, monitoring signal inputs from the rotational speed sensing devices in the second control module, determining a first rotational speed of the input member based upon the signal inputs from the first sensor, determining a second rotational speed of the input member based upon the signal inputs from the first sensor, determining rotational speeds of the torque machines based upon the signal inputs from the rotational speed sensing devices, calculating a third rotational speed of the input member based upon the rotational speeds of the torque machines, comparing the first rotational speed to the third rotational speed and comparing the second rotational speed to the third rotational speed, and detecting an input speed fault when the third rotational speed differs from the first rotational speed by an amount greater than a first threshold and the third rotational speed differs from the second rotational speed by an amount greater than a second threshold.

BRIEF DESCRIPTION OF THE DRAWINGS

One or more embodiments will now be described, by way of example, with reference to the accompanying drawings, in which.

DETAILED DESCRIPTION

Figure 1:
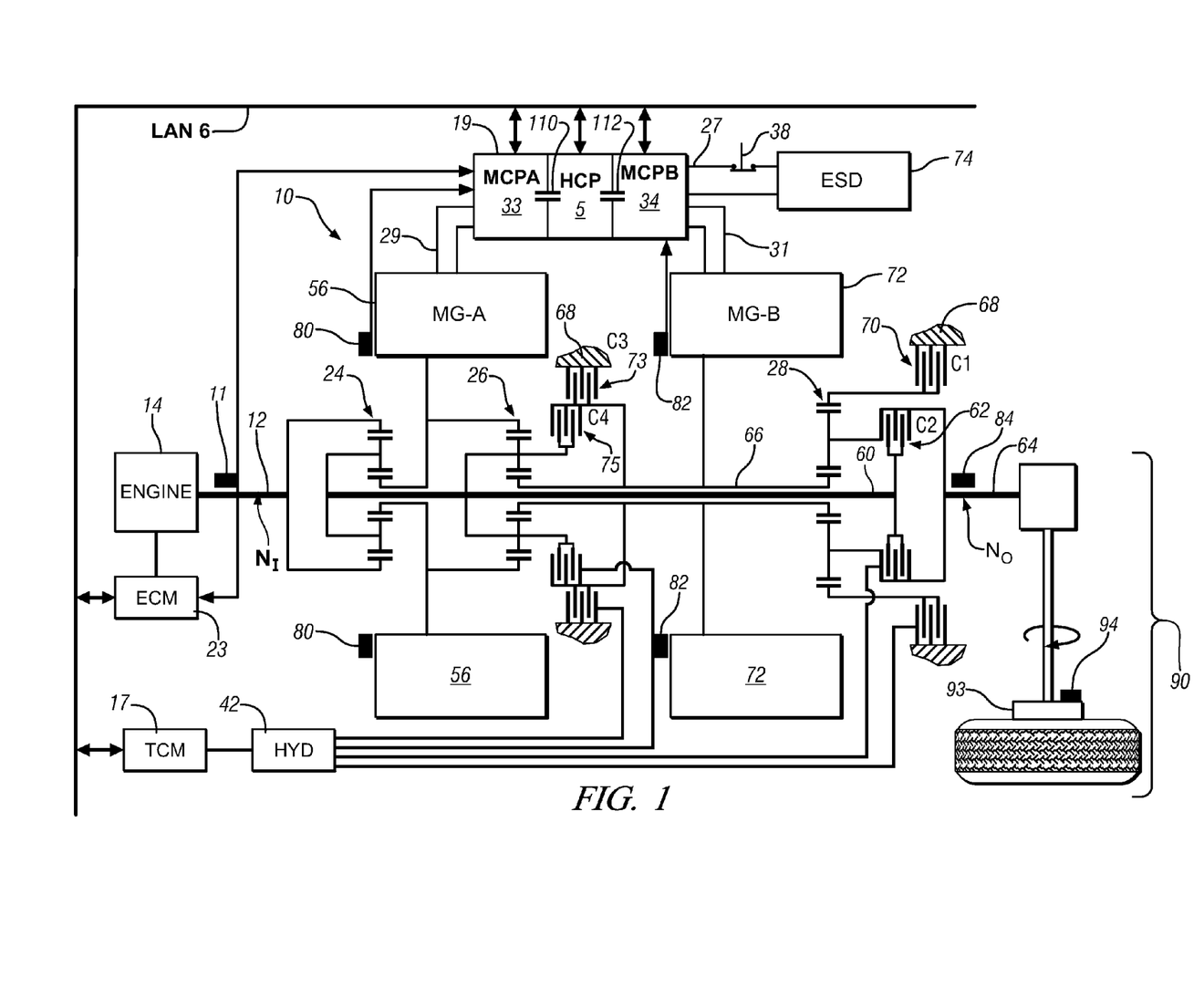
FIG. 1 is a schematic diagram of an exemplary hybrid powertrain, in accordance with the present disclosure.
Figure 2:
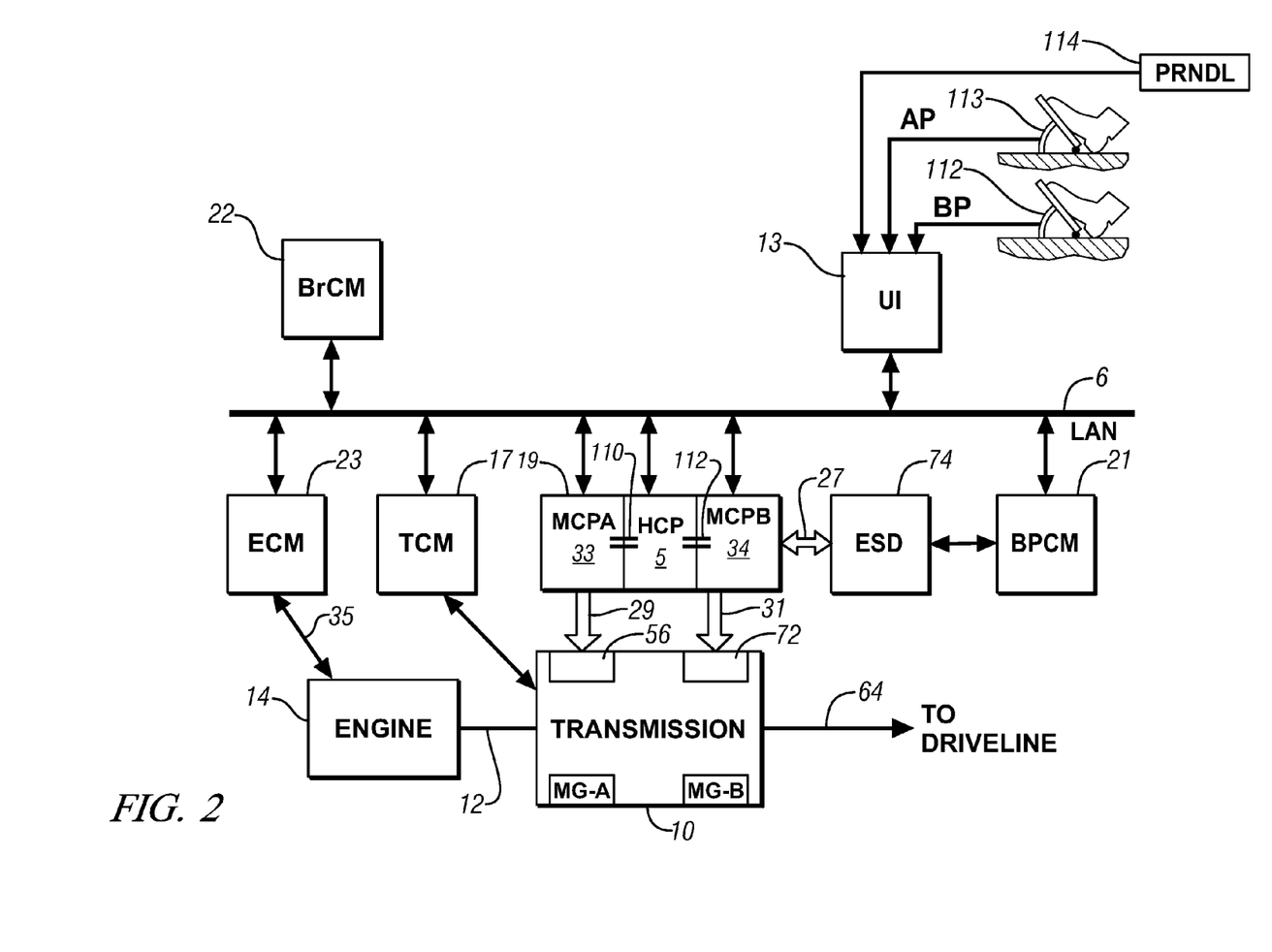
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and torque machines, i.e., the first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective first and second resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

The first and second resolvers 80 and 82 preferably comprise a variable reluctance device including a resolver stator (not shown) and a resolver rotor (not shown). The first and second resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. The first and second resolvers 80 and 82 are signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the first and second resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_o$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques TA and TB. Electrical current is transmitted to and from the ESD 74 in accordance with whether the ESD 74 is being charged or discharged.

The TPIM 19 includes the pair of power inverters (not shown) and respective motor control modules 33 and 34 (hereafter 'MCPA', 'MCPB') for the first and second electric machines 56 and 72 that are configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via respective ones of the DC transfer conductors 27 and transform it to or from three-phase AC power, which is conducted to or from the first and second electric machines 56 and 72 for operation as motors or generators via transfer conductors 29 and 31 respectively.

The TPIM 19 preferably comprises a single control module device including the HCP 5 and the MCPA 33 and MCPB 34. There is a first serial peripheral interface (hereafter 'SPI') bus 110 between the HCP 5 and the MCPA 33, and a second SPI bus 112 between the HCP 5 and MCPB 34. Each SPI bus comprises a full-duplex synchronous serial data link permitting direct communication between the devices. The MCPA 33 directly and individually communicates with the HCP 5 and the MCPB 34 via the first and second SPI buses 110 and 112, thus achieving high-speed communications between the devices without communications delays which occur via a vehicle bus or a hybrid bus. In this embodiment, messages are typically sent from the HCP 5 to the MCPA 33 and MCPB 34 each 6.25 millisecond loop. Furthermore, messages are sent between the HCP 5 and MCPA 33 and MCPB 34 via the SPI buses. In the embodiment, there is a serial control interface (not shown) which effects communication between the MCPA 33 and the MCPB 34.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., SPI buses 110 and 112.

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |

TABLE 1-continued

| Description | Engine State | Transmission Operating Range State | Applied Clutches | |
|---|---|---|---|---|
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and the torque machines comprising the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

FIG. 1 shows a first embodiment of the present disclosure. The rotational speed sensor 11 is directly and signally connected to the MCPA 33 and directly and signally, connected to the ECM 23. During engine operation, the speed sensor 11 monitors a crank wheel mounted on the crankshaft (not shown) of the engine 14. In one embodiment, the crank wheel comprises a plurality of protruding members, i.e., teeth. Preferably, the teeth are evenly disposed along the outer perimeter of the crank wheel, with the exception of one larger gap between two teeth, preferably oriented to coincide with position of the crankshaft at top-dead-center for cylinder number one of the engine 14. The speed sensor 11 is operative to detect each tooth using magnetostrictive or other sensing capability, thereby enabling determining the speed of the crank wheel based upon an elapsed time between adjacent teeth. The transmission output speed sensor 84 is directly signally connected to the TCM 17. The TCM 17, the ECM 23, the MCPA 33, the MCPB 34, and the HCP 5 are signally connected through the LAN bus 6. The first resolver 80 for the first electric machine 56 is signally and operatively connected to the MCPA 33. The second resolver 82 for the second electrical machine 72 is signally and operatively connected to the MCPB 34.

Figure 3:
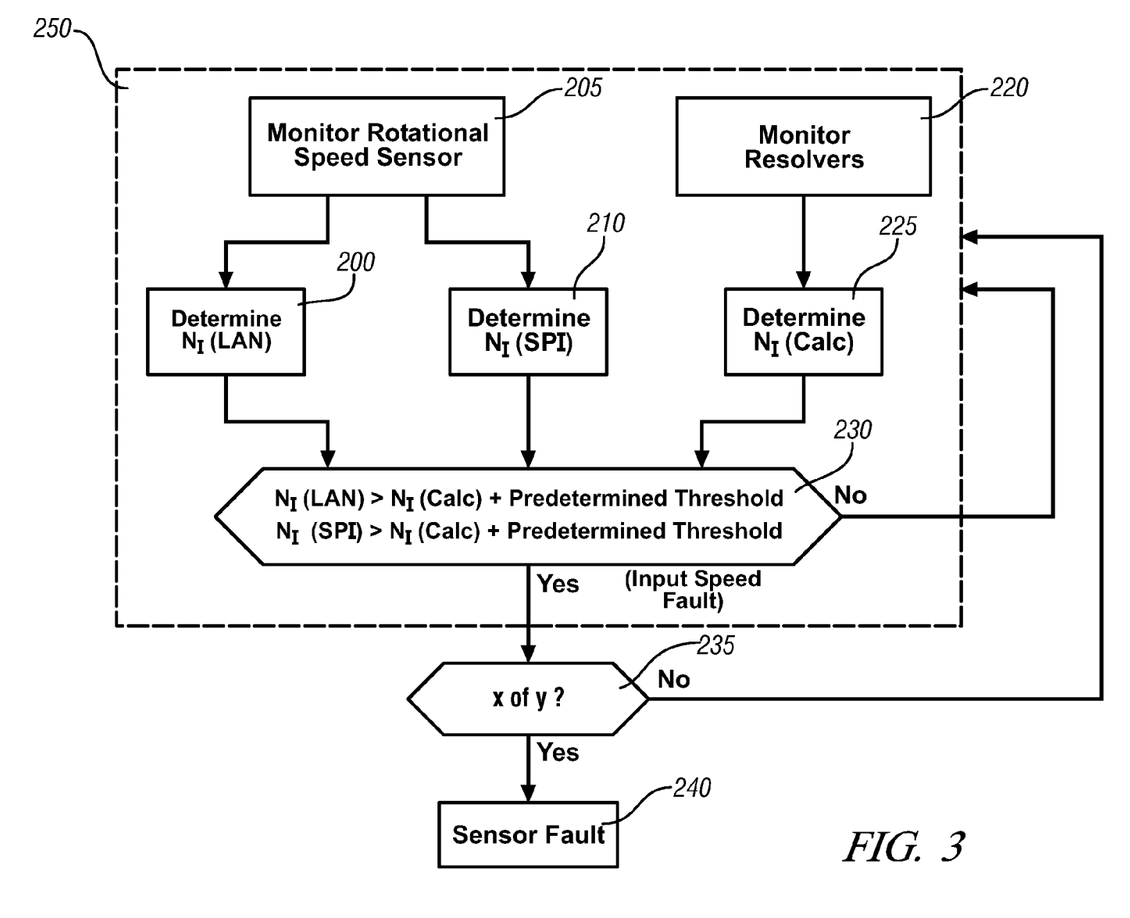
FIG. 3 is a flowchart, in accordance with the present disclosure.

FIG. 3 shows a method 250 for detecting a fault in one of the signal outputs from the first and second motor resolvers 80 and 82 (rotational speed sensing devices). A sensor fault can be detected by monitoring and determining rotational speed of the input member 12 using a plurality of methods. A first rotational speed $N_I$(LAN) of the input member 12 can be determined based upon a signal input from the rotational speed sensor 11 to the ECM 23 (200). The first rotational speed is transmitted to the HCP 5 via the LAN bus 6. A second rotational speed $N_I$(SPI) of the input member 12 can be determined based upon the signal input from the rotational speed sensor 11 to the TPIM 19 (210). The second rotational speed is transmitted to the HCP 5 via the first SPI bus 110.

A third rotational speed $N_I$(CALC) can be determined by determining rotational speeds of the first and second electric machines 56 and 72 based upon monitored signal inputs from the first and second motor resolvers 80 and 82 (225). The third rotational speed can be calculated based thereon. The third rotational speed is calculated based upon the following equation:

$$N_{I\_CALC} = xN_A + yN_B \quad [1]$$

wherein
- x and y represent known parametric values based upon hardware gear and shaft interconnections determined for the specific application,
- $N_A$ represents the rotational speed of the first electric machine 56 based upon the signal input from the first motor resolver 80, and
- $N_B$ represents the rotational speed of the second electric machine 72 based upon the signal input from the second motor resolver 82.

The HCP 5 executes algorithmic code to detect occurrence of an input speed fault once the first rotational speed, the second rotational speed, and the third rotational speed are determined. An input speed fault may be attributable to any one of the rotational speed sensor 11 and associated signal communications or first or second motor resolvers 80 and 82 and associated signal communications. This preferably includes initiating an input speed fault test. The input speed fault test comprises comparing the first rotational speed to the third rotational speed and the second rotational speed to the third rotational speed (230). The input speed fault test detects an input speed fault when a difference between the first rotational speed and the third rotational speed exceeds a first predetermined threshold and a difference between the second rotational speed and the third rotational speed exceeds a second predetermined threshold. The first and second predetermined thresholds may change based upon the speeds of the first and second electrical machines 56 and 72. Preferably, for lower engine rotational speeds, e.g., engine idle conditions, the predetermined threshold ('Δrpm') is in a range of Δrpm=700 to 1200 rpm. Preferably, for higher engine rotational speeds, the predetermined threshold is Δrpm=100 rpm.

The HCP 5 preferably executes the algorithmic code to detect occurrence of an input speed fault subsequent to each detected input from the speed sensor 11 to the ECM 23. The algorithmic code preferably continuously monitors input speed faults in the signal outputs from the first and second motor resolvers 80 and 82. The HCP 5 preferably executes an 'X of Y' fault monitor (235), wherein a sensor fault is determined to have occurred or is indicated when an input speed fault is detected in X of the preceding Y observations (240). A sensor fault may be attributable to any one of the rotational speed sensor 11 and associated signal communications or first or second motor resolvers 80 and 82 and associated signal communications. In one embodiment, a sensor fault is indicated when an input speed fault is detected during greater than half of the preceding observations. In another embodiment, a sensor fault is indicated when an input speed fault is detected during greater than a small portion of the preceding observations.

When a sensor fault is indicated, the HCP 5 may disable or discontinue torque generation by the first and second electrical machines 56 and 72 and operate the engine 14 to propel the vehicle. Additionally, upon determination that a sensor fault has occurred, the HCP 5 may use a camshaft sensor (not shown) to monitor engine rotation and thus monitor the rotational speed of the input member 12 for control and operation of the system.

Additionally, the HCP 5 may track rate changes in the rotational speed of the input member 12. If a rate of change in the rotational speed of the input member 12 is greater than a predetermined threshold, the HCP 5 may disable the first and second electrical machines 56 and 72 and operate the engine 14 with the transmission 10 in one of the fixed gear operating range states to propel the vehicle. The predetermined threshold can be set at a rate of change that is unrealistic for the system to achieve in a predetermined elapsed time. If the HCP 5 determines, above engine idle conditions, that the rotational speed of the input member 12 has not changed for a predetermined elapsed time, i.e., a frozen or static rotational speed, the HCP 5 can deem a fault has occurred and disable the first and second electrical machines 56 and 72. If the HCP 5 determines that frozen rotational speed has been determined the HCP 5 may wait a predetermined elapsed time before determining whether the rotational speed is frozen and an input speed fault has occurred.

Figure 4:
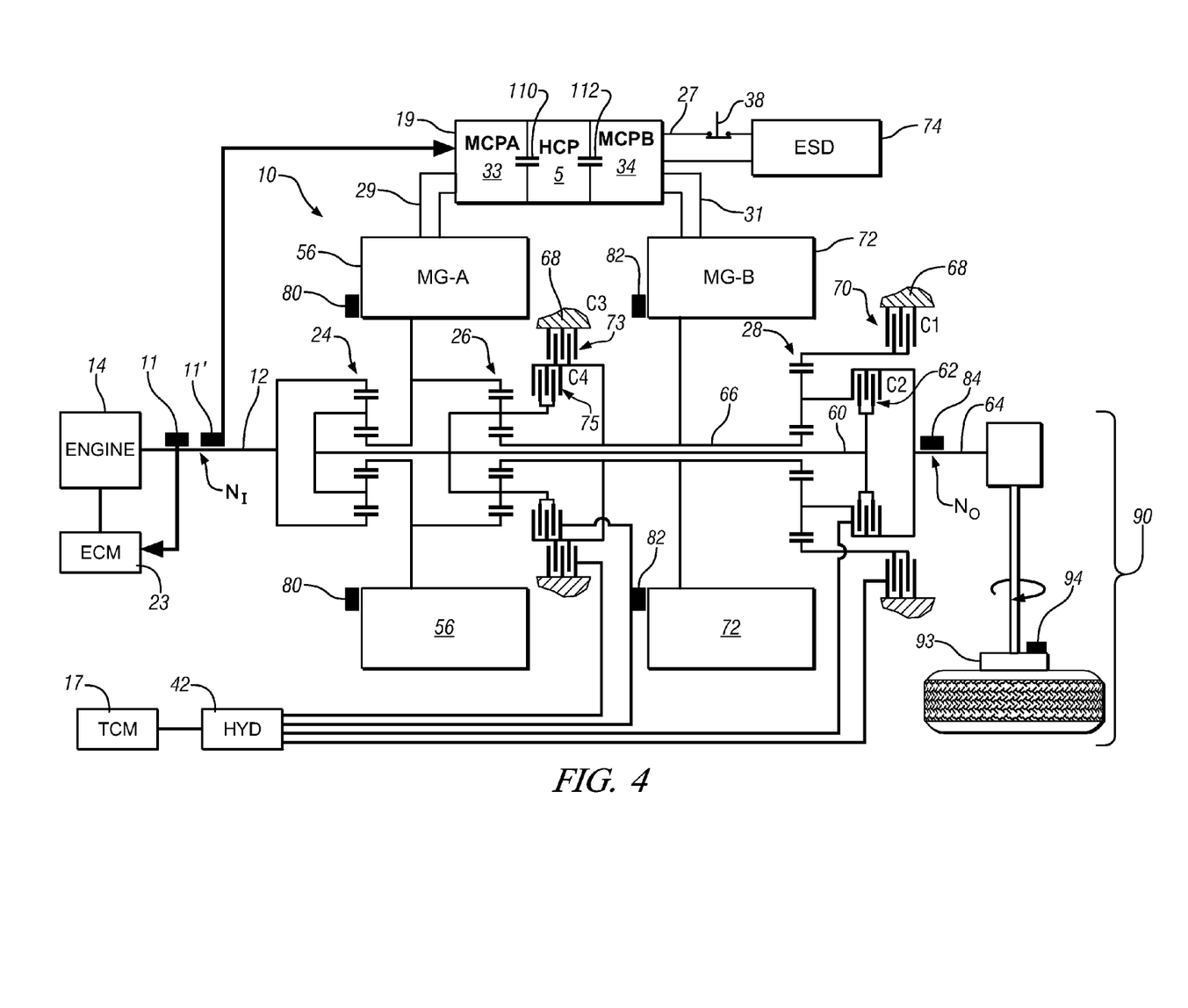
FIG. 4 is a schematic diagram of an exemplary hybrid powertrain, in accordance with the present disclosure.

FIG. 4 shows a second embodiment of a system to which the method described with reference to FIG. 3 for detecting a fault in one of the signal outputs from the first and second motor resolvers 80 and 82 can be applied. The rotational speed sensor 11 is directly signally connected to the ECM 23 via a wire cable, and a second rotational speed sensor 11' is directly signally connected to the MCPA 33, preferably via a second wire cable. The TCM 17, the ECM 23, the MCPA 33, the MCPB 34, and the HCP 5 are signally connected through the LAN bus 6. The first resolver 80 for the first electric machine 56 is signally and operatively connected to the MCPA 33. The second resolver 82 for the second electrical machine 72 is signally and operatively connected to the MCPB 34.

Detecting occurrence of a fault in each of the first and second resolvers 80 and 82 using the second embodiment comprises determining a first rotational speed of the input member 12 based upon a signal input from the rotational speed sensor 11 to the ECM 23. The first rotational speed is transmitted to the HCP 5 via the LAN bus 6. A second rotational speed of the input member 12 is determined based upon a signal input from the second rotational speed sensor 11' to the TPIM 19. The second rotational speed is transmitted to the HCP 5 via the first SPI bus 110. A third rotational speed is calculated as described hereinabove.

Once the first rotational speed, the second rotational speed, and the third rotational speed are determined, the HCP 5 determines if an input speed fault has occurred. A method for determining if an input speed fault has occurred comprises initiating an input speed fault test. The input speed fault test comprises comparing the first rotational speed to the third rotational speed and the second rotational speed, to the third rotational speed. The input speed fault test can detect an input speed fault if a difference between the first rotational speed and the third rotational speed exceeds a first predetermined threshold and a difference between the second rotational speed and the third rotational speed exceeds a second predetermined threshold. The first and second predetermined thresholds may change based upon the speeds of the first and second electrical machines 56 and 72. Preferably, for lower engine rotational speeds, e.g., idle conditions, the difference threshold ('Δrpm') is in a range of Δrpm=700 to 1200 rpm. Preferably, for higher engine rotational speeds, the difference threshold is Δrpm=100 rpm.

The second embodiment may identify component faults based upon the fault counter 235 described hereinabove. The second embodiment can include fault mitigation techniques described hereinabove including disablement of the first and second electrical machines 56 and 72, and use of the camshaft sensor (not shown) to determine the rotational speed of the input member 12. Additionally, input speed faults may be identified based upon changes in the rotational speed of the input member 12 as described hereinabove including input speeds faults identified when the change in the rotational speed is above a predetermined threshold and when the rotational speed is frozen for a predetermined elapsed time period. It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method to monitor a powertrain system including a transmission device including an input member and a first sensor operative to monitor rotation of the input member, a plurality of torque machines and a corresponding plurality of rotational speed sensing devices, an output member, and first and second control modules, the method comprising:
   signally connecting the first sensor directly to the first control module and directly to the second control module;
   signally connecting the rotational speed sensing devices directly to the second control module;
   monitoring signal inputs from the first sensor in the first and second control modules;
   monitoring signal inputs from the rotational speed sensing devices in the second control module;
   determining a first rotational speed of the input member based upon the signal inputs from the first sensor;
   determining a second rotational speed of the input member based upon the signal inputs from the first sensor;
   determining rotational speeds of the torque machines based upon the signal inputs from the rotational speed sensing devices;
   calculating a third rotational speed of the input member based upon the rotational speeds of the torque machines;
   comparing the first rotational speed to the third rotational speed and comparing the second rotational speed to the third rotational speed; and
   detecting an input speed fault when the third rotational speed differs from the first rotational speed by an amount greater than a first threshold and the third rotational speed differs from the second rotational speed by an amount greater than a second threshold.

2. The method of claim 1, further comprising:
   determining the signal inputs from the plurality of rotational speed sensing devices are valid when at least one of
      the third rotational speed differs from the first rotational speed by an amount less than the first threshold and
      the third rotational speed differs from the second rotational speed by an amount less than the second threshold.

3. The method of claim 1, further comprising:
   disabling operation of the torque machines when a sensor fault is detected based upon multiple input speed faults.

4. The method of claim 3, further comprising coupling an engine to the input member to transfer torque to the transmission.

5. The method of claim 4, further comprising:
   monitoring a signal input from a camshaft sensor of the engine; and
   determining the first rotational speed of the input member using the signal input from the camshaft sensor when a speed sensor fault is detected.

6. The method of claim 4, further comprising:
   monitoring signal inputs from the first sensor to determine an engine input speed; and
   detecting the input speed fault based upon the engine input speed.

7. The method of claim 6, wherein the input speed fault is detected when the engine input speed is substantially static for a predetermined elapsed time period.

8. The method of claim 6, wherein the input speed fault is detected when a change in the engine input speed over a predetermined elapsed time period exceeds a predetermined threshold.

9. The method of claim 1, wherein the first and second thresholds are between about 700 and 1200 rpm during an engine idle condition.

10. The method of claim 1 wherein the first and second thresholds are about 100 rpm when the first rotational speed is greater than an engine idle speed.

11. The method of claim 1, further comprising:
    using a fault counter to track detected input speed faults; and
    determining a sensor fault when the fault counter reaches a predetermined number of input speed faults over a predetermined number of observations.

12. The method of claim 11, further comprising
    disabling torque generation in the torque machines when a sensor fault is determined.

13. Method for monitoring a powertrain system including a transmission device operative to transmit torque between an input member, a plurality of torque generative devices, and an output member, the transmission device including a first sensor operative to monitor rotation of the input member, a second sensor operative to monitor rotation of the input member, and a plurality of sensing devices operative to monitor rotations of the torque generative devices, the first and second control modules operative to communicate therebetween, the method comprising:
    signally connecting the first sensor directly to the first control module;
    signally connecting the second sensor directly to the second control module;
    signally connecting the plurality of sensing devices directly to the second control module;
    monitoring signal inputs from the first sensor, the second sensor and the plurality of sensing devices into respectively connected ones of the first and second control modules;
    determining a first rotational speed of the input member based upon the signal input from the first sensor to the first control module;
    determining a second rotational speed of the input member based upon the signal input from the second sensor to the second control module;
    determining rotational speeds of the torque generative devices based upon signal inputs from the plurality of sensing devices to the second control module;
    calculating a third rotational speed of the input member based upon the rotational speeds of the torque generative devices;
    comparing the first rotational speed to the third rotational speed and comparing the second rotational speed to the third rotational speed; and
    detecting an input speed fault in one of the signal inputs from the sensing devices when the third rotational speed differs from the first rotational speed by an amount greater than a first threshold and the third rotational speed differs from the second rotational speed by an amount greater than a second threshold.

14. The method of claim 13, further comprising:
    determining the signal inputs from the plurality of sensing devices are valid when one of the third rotational speed differs from the first rotational speed by an amount less than the first threshold and the third rotational speed differs from the second rotational speed by an amount less than the second threshold.

15. The method of claim 13, further comprising:
disabling torque output from the plurality of electric machines when a sensor fault is detected based upon multiple input speed faults.

16. The method of claim 15, further comprising coupling an engine to the input member to transfer torque to the transmission.

17. The method of claim 16, further comprising:
monitoring a signal input from a camshaft sensor of the engine; and
determining the first rotational speed of the input member using the signal input from the camshaft sensor when a speed sensor fault is detected.

18. The method of claim 17, further comprising:
monitoring engine input speed; and
detecting the input speed fault based upon the monitored engine input speed.

19. The method of claim 13, further comprising:
using a fault counter to track the detected input speed faults; and
determining a sensor fault when the fault counter reaches a predetermined number of input speed faults in a predetermined number of observations.

20. The method of claim 19, further comprising:
controlling torque output from the torque generative devices when a sensor fault is determined.

* * * * *